United States Patent
Sriram et al.

(10) Patent No.: US 8,126,092 B2
(45) Date of Patent: Feb. 28, 2012

(54) MULTISTAGE PN CODE ACQUISITION CIRCUIT AND METHOD

(75) Inventors: Sundararajan Sriram, Dallas, TX (US); Srinath Hosur, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 1666 days.

(21) Appl. No.: 10/918,839

(22) Filed: Aug. 13, 2004

(65) Prior Publication Data
US 2005/0018646 A1   Jan. 27, 2005

Related U.S. Application Data

(62) Division of application No. 09/533,311, filed on Mar. 22, 2000, now Pat. No. 6,831,929.

(60) Provisional application No. 60/125,443, filed on Mar. 22, 1999.

(51) Int. Cl.
    *H04L 27/06* (2006.01)
(52) U.S. Cl. ........................................ 375/343
(58) Field of Classification Search ............ 375/354, 375/343, 357, 369, 372, 373, 374; 370/395.62, 370/507; 708/89; 713/375, 400; 435/265; 702/89
    See application file for complete search history.

(56) References Cited

U.S. PATENT DOCUMENTS

| | | | |
|---|---|---|---|
| 5,754,604 A | 5/1998 | Li et al. | |
| 5,781,543 A | 7/1998 | Ault et al. | |
| 6,031,415 A | 2/2000 | Shou et al. | |
| 6,049,576 A | 4/2000 | Magill | |
| 6,181,733 B1 | 1/2001 | Shinde | |
| 6,185,244 B1 | 2/2001 | Nyström et al. | |
| 6,208,632 B1 | 3/2001 | Kowalski et al. | |
| 6,345,069 B1 | 2/2002 | Dabak et al. | |
| 6,363,060 B1 | 3/2002 | Sarkar | |
| 6,385,259 B1 | 5/2002 | Sung et al. | |
| 6,480,558 B1 * | 11/2002 | Ottosson et al. | 375/350 |
| 6,553,059 B1 * | 4/2003 | Ito | 375/150 |
| 6,567,482 B1 * | 5/2003 | Popovic′ | 375/343 |

FOREIGN PATENT DOCUMENTS

| | | |
|---|---|---|
| EP | 0 825 737 A | 2/1998 |
| GB | 2 323 749 A | 7/1998 |

OTHER PUBLICATIONS

"CPM Based Fast Cell Search Algorithm (Link Level Simulation Results)", ETSI SMG2 UMTS L1 Expert Group, Tdoc SMG2 UMTS-L1 s209x006, Espoo, Finland, Source: TTA, Jan. 18-20, 1999.

(Continued)

*Primary Examiner* — Sam K Ahn

(74) *Attorney, Agent, or Firm* — Ronald O. Neerings; Wade James Brady, III; Frederick J. Telecky, Jr.

(57) ABSTRACT

A circuit for detecting a serial signal comprises a first circuit coupled to receive the serial signal during a predetermined plurality of time periods of substantially equal duration. The first circuit is coupled to receive a first code. The first circuit is arranged to compare a part of the serial signal corresponding to each time period of the plurality of timer periods to the first code, thereby producing a match signal. The first circuit accumulates the match signal from each of the each time period of the plurality of time periods.

20 Claims, 4 Drawing Sheets

OTHER PUBLICATIONS

Fast Long Code Acquisition Using Code Position Modulation (CPM), IMT-2000 Study Committee, Air-interface WG, SWG2, Document No. AIF/SWG2-32-10 (P), Cell Search, Source: TTA, Dec. 1, 1998.

"UMTS Terrestrial Radio Access Concept Evaluation", ETSI Technical Report, Dec. 1997, pp. 47-48, XP002109765.

"Fast Cell Search Algorithm in DS-CDMA Mobile Radio Using Long Spreading Codes", K. Higuchi, et al., Vehicular Technology Conference, 1997, IEEE $47^{th}$ Phoenix, AZ, USA May 4-7, 1997, New York, NY, USA, IEEE, US, Apr. 5, 1997, pp. 1430-1434, XP010229096, ISBN: 0-7803-3659-3.

* cited by examiner

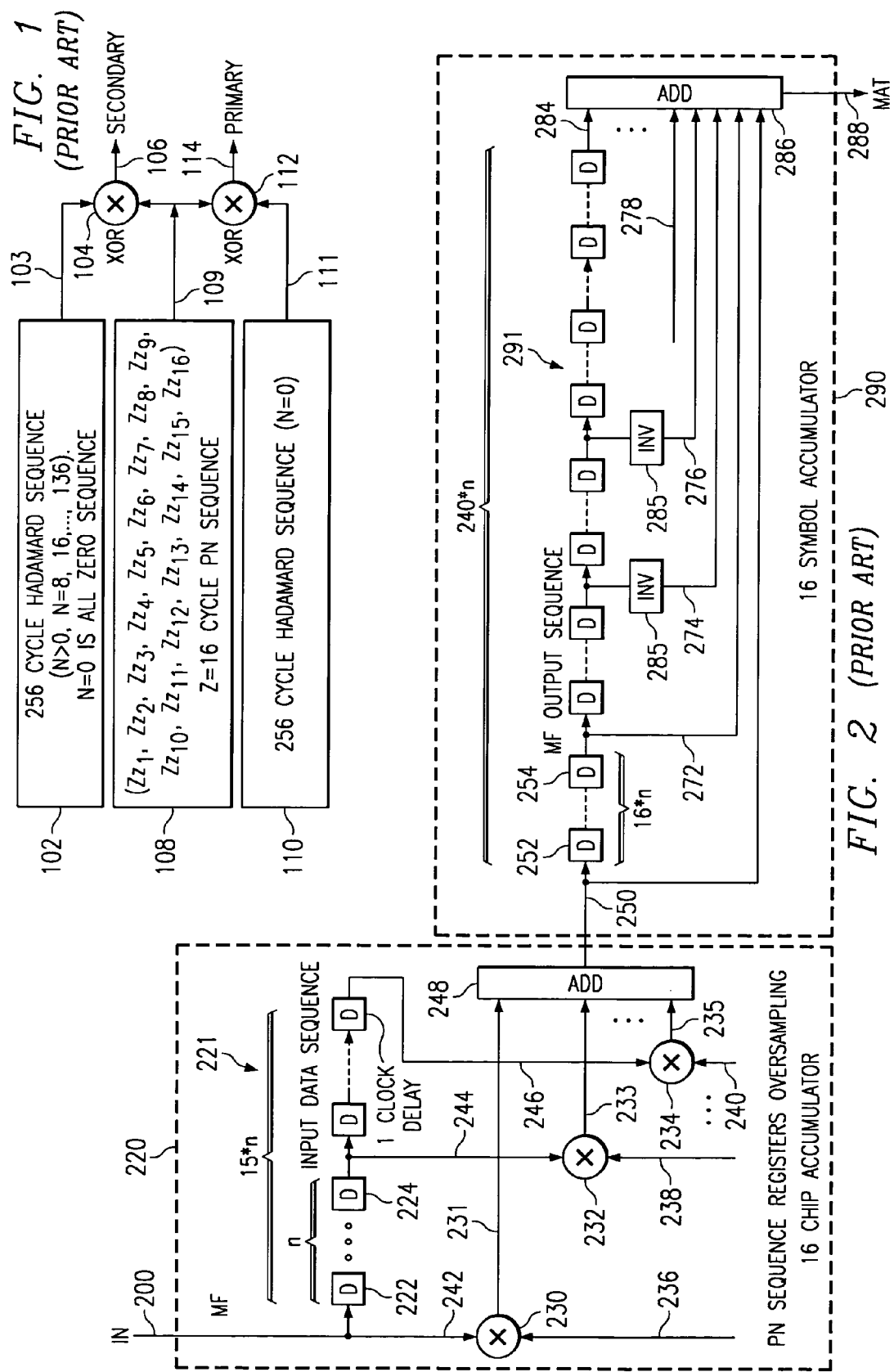

MULTISTAGE PN CODE ACQUISITION CIRCUIT AND METHOD

CLAIM TO PRIORITY OF PROVISIONAL APPLICATION

This application claims priority under 35 U.S.C. 120 of divisional application Ser. No. 09/533,311, filed Mar. 22, 2000, now U.S. Pat. No. 6,831,929, which claims priority under 35 U.S.C. §119(e)(1) of provisional application Ser. No. 60/125,443, filed Mar. 22, 1999.

FIELD OF THE INVENTION

This invention relates to wideband code division multiple access (WCDMA) for a communication system and more particularly to detection of primary or secondary synchronization codes for WCDMA cell acquisition.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in U.S. patent application Ser. No. 90/217,759, entitled Simplified Cell Search Scheme for First and Second Stage, filed Dec. 21, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within the cell or within range. The frames may propagate in a discontinuous transmission (DTX) mode within the cell. For voice traffic, transmission of user data occurs when the user speaks, but no data symbol transmission occurs when the user is silent. Similarly for packet data, the user data may be transmitted only when packets are ready to be sent. The frames include pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N). This number of chips in the symbol is the spreading factor.

Previous WCDMA base stations have broadcast primary (PSC) and secondary (SSC) synchronization codes to properly establish communications with a mobile receiver. The PSC identifies the source as a base station within the cell. The SSC further identifies a group of synchronization codes that are selectively assigned to base stations that may transmit within the cell. Referring now to FIG. 1, there is a simplified block diagram of a circuit of the prior art for generating primary and secondary search codes. These search codes modulate or spread the transmitted signal so that a mobile receiver may identify it. Circuits 102 and 110 each produce a 256 cycle Hadamard sequence at leads 103 and 111, respectively. Either a true or a complement of a 16-cycle pseudo-random noise (PN) sequence, however, selectively modulates both sequences. This 16-cycle PN sequence is preferably a binary Lindner sequence given by $Z=\{1,1,-1,-1,-1,-1,1,-1, 1,1,-1,1,1,1,-1,1\}$. Each element of the Lindner sequence is further designated $z_1$-$z_{16}$, respectively. Circuit 108 generates a 256-cycle code at lead 109 as a product of the Lindner sequence and each element of the sequence. The resulting PN sequence at lead 109, therefore, has the form $\{Z,Z,-Z,-Z,-Z,-Z,Z,-Z,Z,Z,Z,-Z,Z,Z,Z,-Z,Z\}$. Exclusive-OR circuit 112 modulates the Hadamard sequence on lead 111 with the PN sequence on lead 109, thereby producing a PSC on lead 114. Likewise, exclusive-OR circuit 104 modulates the Hadamard sequence on lead 103 with the PN sequence on lead 109, thereby producing an SSC on lead 106.

A WCDMA mobile communication system must initially acquire a signal from a remote base station to establish communications within a cell. This initial acquisition, however, is complicated by the presence of multiple unrelated signals from the base station that are intended for other mobile systems within the cell as well as signals from other base stations. The base station continually transmits a special signal at 16 KSPS on a perch channel, much like a beacon, to facilitate this initial acquisition. The perch channel format includes a frame with sixteen time slots, each having a duration of 0.625 milliseconds. Each time slot includes four common pilot symbols, four transport channel data symbols and two search code symbols. These search code symbols include the PSC and SSC symbols transmitted in parallel. These search code symbols are not modulated by the long code, so a mobile receiver need not decode these signals with a Viterbi decoder to properly identify the base station. Proper identification of the PSC and SSC by the mobile receiver, therefore, limits the final search to one of sixteen groups of thirty-two comma free codes each that specifically identify a base station within the cell to a mobile unit.

Referring to FIG. 2, there is a circuit of the prior art for detecting the PSC and SSC generated by the circuit of FIG. 1. The circuit receives the PSC symbol from the transmitter as an input signal IN on lead 200. The signal is periodically sampled in response to a clock signal by serial register 221 at an oversampling rate n. Serial register 221, therefore, has 15*n stages for storing each successive sample of the input signal IN. Serial register 221 has 16 (N) taps 242-246 that produce 16 respective parallel tap signals. A logic circuit including 16 XOR circuits (230, 232, 234) receives the respective tap signals as well as sixteen respective PN signals to produce sixteen output signals (231, 233, 235). This PN sequence matches the transmitted sequence from circuit 108 and is preferably a Lindner sequence. Adder circuit 248 receives the sixteen output signals and adds them to produce a sequence of output signals at terminal 250 corresponding to the oversampling rate n. An oversampling rate of n=1, for example, corresponds to one sample per chip, 256 samples per symbol, 2560 samples per time slot, and 40,960 samples per frame.

A 16-symbol accumulator circuit 290 receives the sequence of output signals on lead 250. The accumulator circuit 290 periodically samples the sequence on lead 250 in serial register 291 in response to the clock signal at the oversampling rate n. Serial register 291, therefore, has 240*n stages for storing each successive sample. Serial register 291 has sixteen taps 250-284 that produce sixteen respective parallel tap signals. Inverters 285 invert tap signals corresponding to negative elements of the Lindner sequence. Adder circuit 286 receives the sixteen output signals and adds them to produce a match signal MAT at output terminal 288 in response to an appropriate PSC symbol. This match result is subsequently stored in a buffer memory. In this manner, the match filter circuit samples the entire PN sequence at lead 200 for one frame of 10 milliseconds. Thus, the match filter detects a PSC symbol common to each time slot and an SSC symbol corresponding to each respective time slot. After the 10-millisecond sample period of first-stage cell acquisition, the match filter is reset and repeats the match process for a next frame. The previously acquired time of the PSC symbol match as well as the sixteen SSC symbols are passed to a second-stage of cell acquisition.

Referring to FIG. 3, there is a diagram showing cell acquisition of the prior art. The first-stage cell acquisition begins at time 301 when the first-stage 300, including match filter 220, 290 and buffer memory (not shown) are reset. The first-stage circuit 300 sequentially samples a PN sequence at lead 200 for 10 milliseconds. The results of the PSC symbol match from the first-stage circuit are passed 306 to a second-stage circuit 312 and the first-stage circuit is reset 303. The first-stage circuit 302 repeats the match sequence for the next 10-millisecond period. The second-stage circuit receives the sample time of the PSC symbol and determines the time of each SSC symbol in each time slot by a cumulative 0.625 millisecond offset of each sequential SSC symbol. The second-stage circuit decodes this sequence of SSC symbols to identify the position within the frame of the first PSC symbol match as well as which one of sixteen code groups are received from the base station. The code group identity is then passed 318 to a third-stage circuit 324. The third-stage circuit identifies one of thirty-two long code sequences in the code group that will be used to demodulate received data symbols.

These circuits of the prior art require significant memory and processing power to generate and identify the PSC and SSC. For example, each delay circuit 222, 224, 252 and 254 requires a memory cell for each PN sample. The subsequent buffer memory requires a similar memory size to store samples for second-stage cell acquisition. Moreover, a higher sample rate n requires a correspondingly greater memory size. An alternative scheme of Code Position Modulation (CPM) has been proposed which does not require a PSC match. This CPM scheme places SSC symbols at various symbol times within a PN sequence frame. The match filter must then correctly match the SSC symbol in each time slot of the frame and use the position of the SSC symbols within their respective time slots to determine the correct code group for second-stage cell acquisition. This method advantageously eliminates the step of PSC matching. The requirement to independently match and identify the position of each SSC symbol of the frame, however, results in increased circuit complexity without tangible gain.

Other studies such as by Ericsson, *Comparisons of Cell Search Schemes. 3GPP Versus CPM*, Feb. 26, 1999, have suggested that CPM acquisition is inferior to the existing 3GPP acquisition procedure as described with respect to FIG. 2. Furthermore, their study suggests that first-stage acquisition may be improved by continually accumulating the match filter output of the PSC symbol without resetting the match filter or subsequent buffer memory. This technique, however, presents other problems in first-stage cell acquisition. During initial acquisition by a mobile receiver after power-up, the mobile uses an internal clock to time PN sequence samples. This internal clock frequency is typically much less stable than the base station clock frequency. Moreover, it is not synchronized with the base station clock frequency and may experience a relative clock frequency drift of several KHz. This clock frequency drift during initial acquisition, therefore, increasingly disperses the initial PSC symbol match with each accumulated frame sample. This dispersion with increasing frame samples reduces the probability $P_1$ of a correct first-stage PSC symbol match.

SUMMARY OF THE INVENTION

These problems are resolved by a circuit for detecting a serial signal comprising a first circuit coupled to receive the serial signal during a predetermined plurality of time periods of substantially equal duration. The first circuit is coupled to receive a first code and compares a part of the serial signal corresponding to each time period of the plurality of time periods to the first code, thereby producing a match signal. The first circuit accumulates the match signal from each time period of the plurality of time periods.

The present invention improves cell acquisition. Clock frequency drift is minimized during initial acquisition.

BRIEF DESCRIPTION OF THE DRAWINGS

A more complete understanding of the invention may be gained by reading the subsequent detailed description with reference to the drawings wherein:

FIG. 1 is a simplified block diagram of a typical transmitter circuit of the prior art for producing primary (PSC) and secondary (SSC) synchronization codes;

FIG. 2 is a block diagram of a mobile receiver match filter circuit of the prior art for first-stage cell acquisition;

DETAILED DESCRIPTION OF THE PREFERRED EMBODIMENTS

A mobile unit must select a base station from several candidate base stations at power-up and during soft handoff within a cell. The selection process is based on received power from each base station. There may, however, be as many as twenty candidate base stations to evaluate during the selection process. Selection of a particular base station requires cell acquisition of each base station to develop a candidate list. This cell acquisition includes three stages as previously described. The first stage includes detecting a primary synchronization channel (PSC) code from a serial pseudorandom noise (PN) sequence. This PSC code is common to all base stations within a network and to each time slot of a received frame. First-stage acquisition, therefore, may identify any of several PSC codes. Second-stage acquisition uses the time of the PSC code to extract a code from a secondary synchronization channel (SSC). This SSC code includes sixteen code sequences and is transmitted simultaneously with the PSC code. The SSC code, however, is unique to each base station. Furthermore, the order of the SSC code sequences identifies the position within the frame where the PSC code was identified during first-stage acquisition and a group of thirty-two long codes used by the base station. Finally, in third-stage acquisition, the mobile unit must identify the one of thirty-two long code sequences to demodulate the received signal.

The time required for cell acquisition Tacq is approximately equal to Tacc/Pd, where Tacc is the time required by the first stage and Pd is the probability of detection. The probability of detection Pd may typically have a value of 0.1, and Tacc typically has a value of 10 milliseconds. During initial acquisition at power-up, however, the mobile receiver internal clock is not synchronized with the base station clock and the Pd may be significantly less than 0.1. Thus, the first stage may dominate the three-stage acquisition process during power-up.

Figure 3:
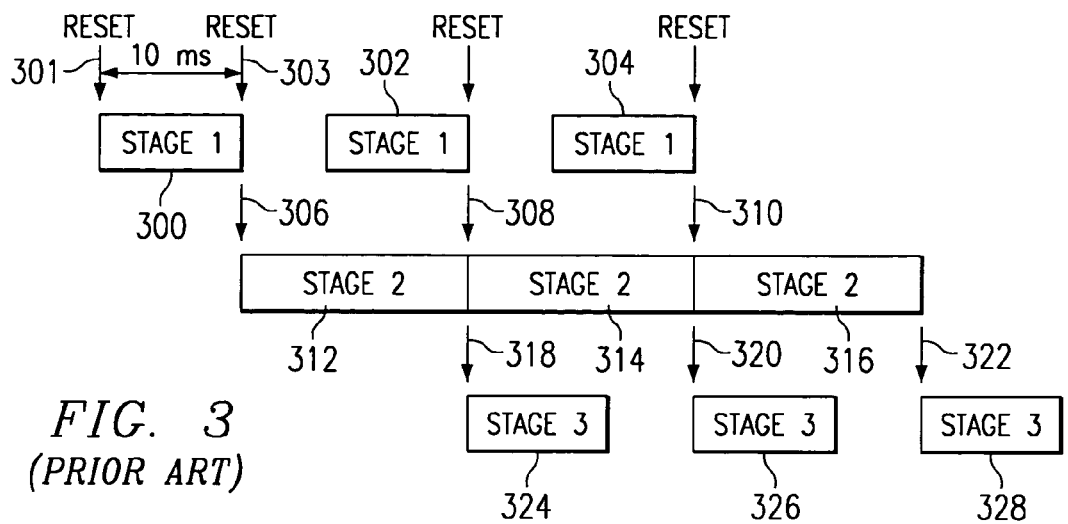
FIG. 3 is a cell acquisition diagram of the prior art.
Figure 4:
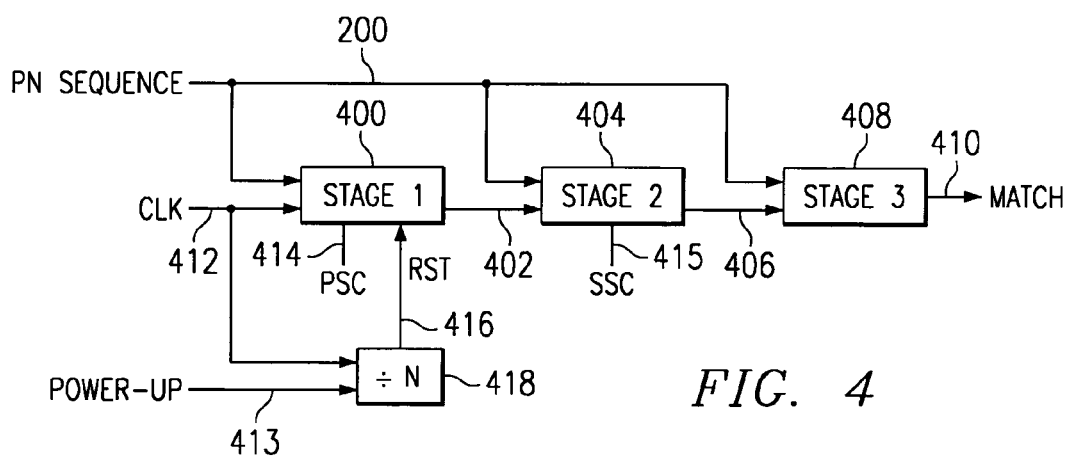
FIG. 4 is a block diagram of an embodiment of a cell acquisition circuit of the present invention.

Referring now to FIG. 4, there is a block diagram of an embodiment of a cell acquisition circuit of the present invention. The circuit includes a first-stage circuit 400 that is coupled to receive a serial PN sequence on lead 200. The serial PN sequence signal includes a data frame having a predetermined plurality of preferably sixteen time slots. Each time slot has a duration of approximately 0.625 milliseconds. The serial PN sequence is sampled by the first-stage circuit at a rate determined by clock signal CLK at lead 412. The sample is preferably an integral multiple n of the chip time. The first-stage circuit 400 is also coupled to receive a PSC code on lead 414. The first-stage circuit compares each sample of the serial PN sequence signal to the PSC code and produces a match signal at lead 402. A frequency divider circuit 418 is coupled to receive the clock signal CLK at lead 412 and a power-up signal at lead 413. The frequency divider circuit divides the clock signal CLK frequency by N to produce a reset signal RST on lead 416. This reset signal RST is applied to the first-stage circuit 400 to reset accumulated decision variables. When the power-up signal is high at initial power-up, the frequency divider divides by N preferably having a value of 32*2560 corresponding to thirty-two time slots. The first-stage circuit, therefore, accumulates the result of the PSC code comparison to the serial PN sequence during power-up over thirty-two time slots to produce the match signal at lead 402. Alternatively, when the power-up signal is low during a soft handoff from one base station to another, the frequency divider divides by N preferably having a value of 16*2560 corresponding to sixteen time slots. The first-stage circuit, therefore, accumulates the result of the PSC code comparison to the serial PN sequence during soft handoff over sixteen time slots to produce the match signal at lead 402.

This variable accumulation offers significant advantages in first-stage acquisition. First, the mobile unit improves first-stage acquisition significantly during power-up by accumulating the PN sequence and PSC code match result over a predetermined number of time slots. The first-stage circuit is reset after this predetermined number of accumulations, thereby minimizing secondary match signals due to clock frequency drift. Second, overall cell acquisition time is minimized during soft handoff periods when the mobile clock frequency is synchronized to a stable base station clock frequency. Third, the present invention is completely compatible with existing communication standards. Finally, minimal additional circuitry is required to implement the present invention.

The PSC match signal at lead 402 is applied to the second-stage circuit 404. The match signal includes an accumulated maximum value at a chip time corresponding to a match between the serial PN sequence and the PSC code. The second-stage circuit also receives the PN sequence on lead 200 and the SSC codes on lead 415. The second-stage circuit extracts sixteen SSC symbols corresponding to the PSC match time for each of the sixteen time slots. The second-stage circuit compares these sixteen extracted SSC symbols to the SSC codes on lead 415 to determine their order as well as their position within the received frame. The second-stage circuit decodes these SSC symbols to identify the frame timing and code group corresponding to the received signal as will be described in detail. This code group identity is passed to a third-stage circuit 408 via lead 406. The third-stage circuit determines which of thirty-two long codes in the identified code group has been received. The third-stage circuit produces this long code identity match signal on lead 410. The long code identity match signal is used by the mobile receiver to demodulate the received signal from the remote base station.

Figure 5:
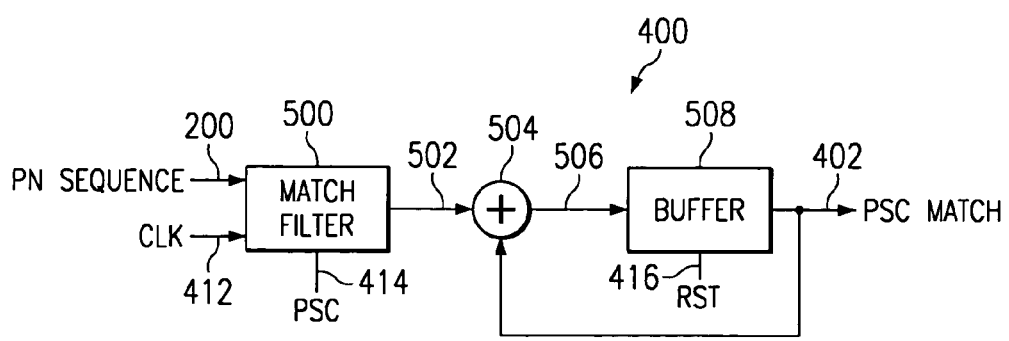
FIG. 5 is a block diagram of a first-stage circuit that may be used by the cell acquisition circuit of FIG. 4.

Referring now to FIG. 5, there is a block diagram of a first-stage circuit that may be used by the cell acquisition circuit of FIG. 4. The first-stage circuit includes a match filter circuit 500 that is coupled to receive the serial PN sequence on lead 200 and the PSC code on lead 414. The match filter circuit 500 produces a match signal at lead 502 having a level corresponding to each sample time of the clock signal CLK at lead 412. This match signal at lead 502 is added to the recirculated contents of buffer memory circuit 508 on lead 402 by adder circuit 504. A sum signal from adder circuit 504 is returned to buffer memory circuit 508 via lead 506. Thus, the output signal from match filter circuit 500 accumulates in buffer memory circuit 508 as long as reset signal RST at lead 416 is low and produces a PSC match signal at lead 402. When reset signal RST at lead 416 goes high, the contents of buffer memory circuit 508 is reset to an all-zero state in preparation for the next match signal accumulation.

Figure 6:
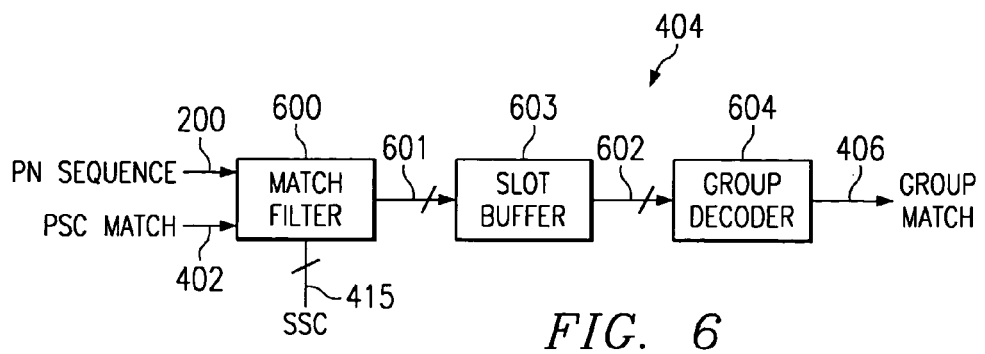
FIG. 6 is a block diagram of a second-stage circuit that may be used by the cell acquisition circuit of FIG. 4.

Turning to FIG. 6, there is a block diagram of a second-stage circuit that may be used by the cell acquisition circuit of FIG. 4. This second-stage circuit includes a match filter circuit 600, a slot buffer memory circuit 603 and a group decoder circuit 604. The match filter circuit is coupled to receive the PN sequence on lead 200 and the PSC match signal on lead 402. The match filter also receives sixteen SSC codes on bus 415. Results of the match filter compare are applied to the slot buffer memory circuit 603 via bus 601. The slot buffer memory circuit 603 has sixteen memory locations for each of sixteen respective sampled time slots. The sixteen SSC code symbol compare values are applied to group decode circuit 604 via bus 602. Group decode circuit 602 decodes the SSC symbols to identify one of sixteen possible code groups and to determine which of sixteen time slots produced the PSC code match. Group decode circuit 604 produces decoded output signals on bus 406 corresponding to the sequence of SSC code symbols. These decoded output signals are applied to the third-stage decode circuit 408 to complete cell acquisition.

In operation, the match filter circuit 600 compares the PN sequence to each of the sixteen SSC codes on bus 415 at the times indicated by the PSC match signal. The match filter circuit produces sixteen match signals on bus 601 corresponding to each time slot. One of the sixteen match signals has a magnitude substantially greater than the other fifteen indicating an SSC code match. The other fifteen signals are comprise noise. All sixteen match signals for each of sixteen time slots are stored in slot buffer memory circuit 603. The group decode circuit 604 adds the maximum value match signal from each respective time slot to produce a decision variable. The group decode circuit also adds each cyclic shift of the maximum value match signal to produce fifteen other decision variables. These fifteen other decision variables are preferably additive noise. A comparison of the maximum decision variable with fifteen other decision variables produces the order of SSC codes as well as their position within the frame. This soft decision process is highly advantageous in decoding the SSC codes. Correct SSC code symbol match values from each time slot reinforce each other and increase the value of the resulting decision variable. Incorrect SSC code symbol match values add as noise. Thus, a comparison or soft decision from decision variables produces an improved signal-to-noise ratio compared to a hard decision based on the magnitude of each individual SSC code symbol value.

Figure 7:
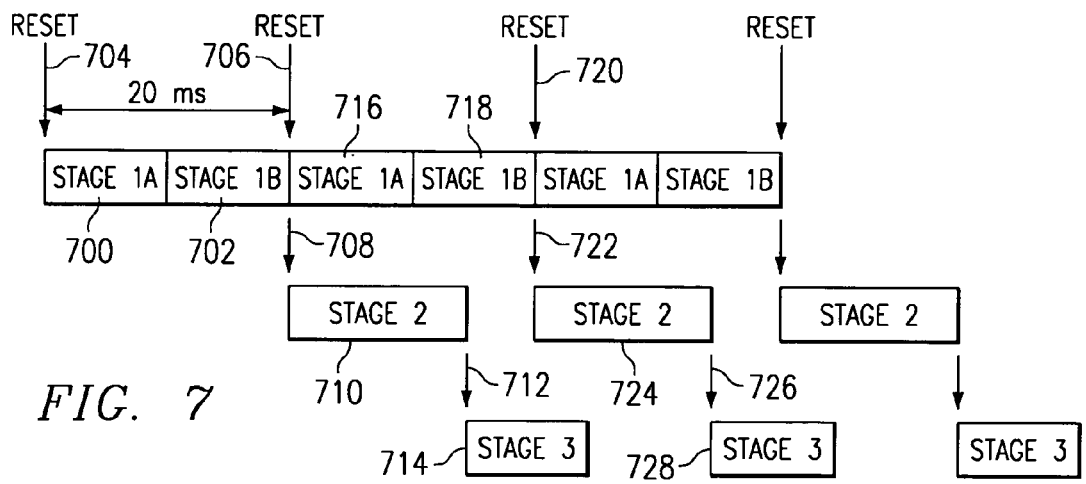
FIG. 7 is a cell acquisition diagram for the circuit of FIG. 4 of the present invention.

Referring now to FIG. 7, there is a cell acquisition diagram for the circuit of FIG. 4 of the present invention. During a soft handoff acquisition, cell acquisition begins with a reset signal at time 704 to clear buffer memory circuit 508. The buffer memory circuit then accumulates a match signal over 20 milliseconds during stage 1A (700) and stage 1B (702). This accumulation period may include a part of a first frame, a complete second frame, and a part of a third frame. This sample period assures acquisition of two PSC symbols and two SSC symbols for each time slot of at least two frames. The accumulated result is passed to stage 2 (710) at time 708. The first stage circuit is then reset at time 706 and begins to accumulate a match signal for another 20 milliseconds during stage 1A (716) and stage 1B (718). The second-stage circuit 404 decodes the result of the first-stage match and passes the result to stage 3 (714) at time 712. Thus, the first-stage acquisition of the present invention advantageously provides for match signal accumulation over a predetermined number of frames. This first-stage accumulation period (716, 718) proceeds in parallel with second-stage 710 and third-stage 714 acquisition periods, thereby minimizing overall cell acquisition time.

Figure 8:
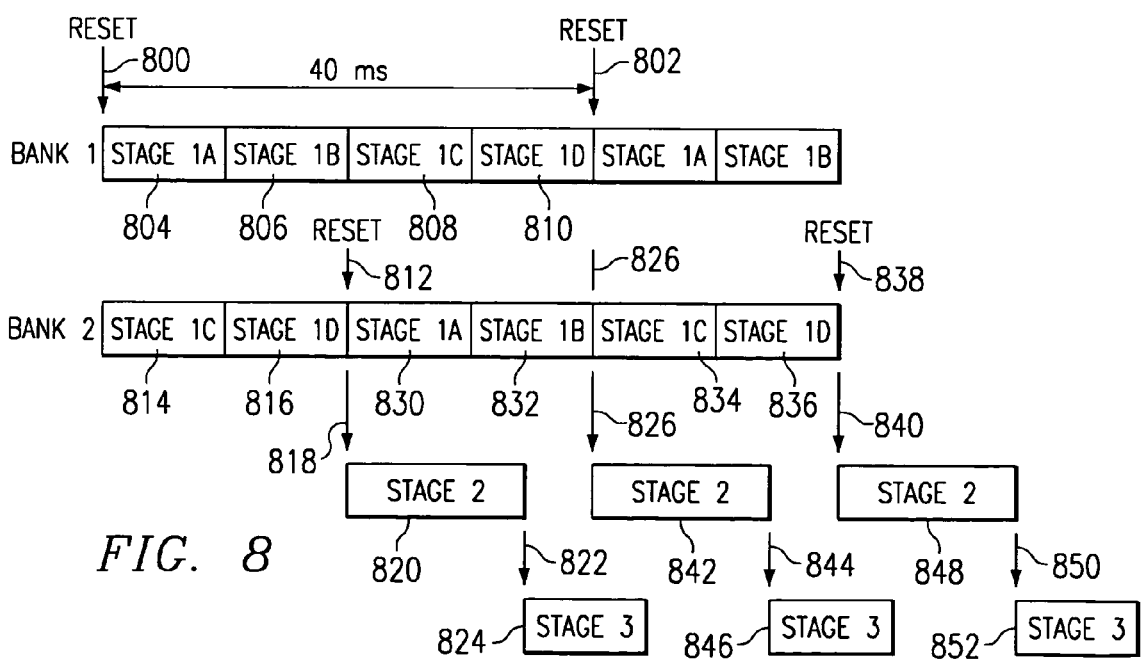
FIG. 8 is a cell acquisition diagram for another embodiment of the circuit of FIG. 4 of the present invention.

Referring to FIG. 8, there is an alternative embodiment of a cell acquisition diagram for the circuit of FIG. 4 of the present invention. Cell acquisition may optimally require a greater predetermined number of accumulated samples. The first stage accumulation process, therefore, is partitioned into overlapping banks to minimize cell acquisition time. The first-stage accumulation begins with bank 2. Stages 1C (814) and 1D (816) terminate the bank 2 accumulation and pass the result to stage 2 (820) at time 818. Stage 2 decoding 820 is completed at time 822 and passes the result to stage 3 (824) at time 822. Meanwhile, the next first-stage accumulation of bank 2 begins with stage 1A (830) and extends through stage 1D (836). First-stage accumulation by bank 1 begins with the reset signal at time 800 and proceeds for 40 milliseconds until the reset signal at time 802. The bank 1 accumulation includes stages 1A-1D (804-810) and overlaps with bank 2 accumulation. Upon completion of bank 2 accumulation, the result passes to stage 2 (842) at time 826. Bank 1 is then reset 802 and begins the next period of accumulation. The overlapping banks advantageously provide for extended first-stage accumulation without increasing overall cell acquisition. Moreover, this extended accumulation period improves PSC code detection without introducing other errors due to clock frequency drift.

Figure 9:
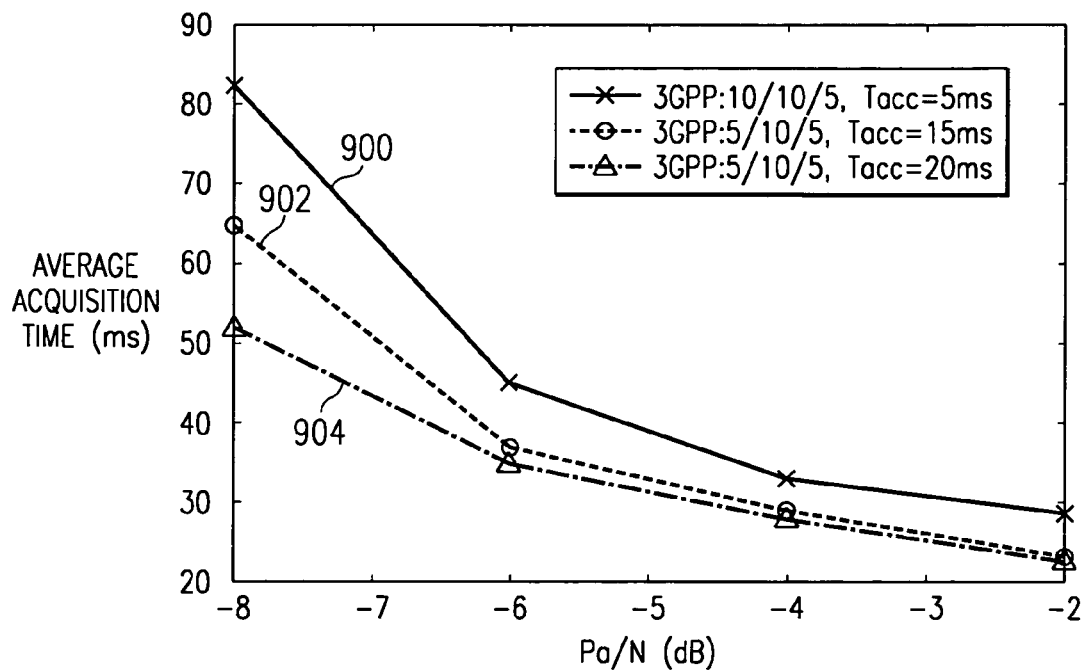
FIG. 9 is a simulation showing initial cell acquisition time as a function of the probability of acquisition.

Turning now to FIG. 9, there is a simulation showing initial cell acquisition time as a function of the base station transmit power-to-noise ratio. The simulation shows three curves representing time in each of stage 1, stage 2 and stage 3 acquisition. The time Tacc is the time between stage 1 reset signals. For example, curve 900 indicates 10/10/5 corresponding to 10 milliseconds in stage 1, 10 milliseconds in stage 2 and 5 milliseconds in stage 3. Tacc for curve 900 is 5 milliseconds. Each second-stage acquisition corresponding to curve 900, therefore, only accumulates PSC code match values for eight time slots before stage 2. Alternatively, curve 902 accumulates PSC code match values for 15 milliseconds over twenty-four time slots and shows a significant reduction in acquisition time compared to curve 900. By way of comparison, curve 904 shows an even greater reduction in initial acquisition time with 20 milliseconds of accumulated PSC code values.

Figure 10:
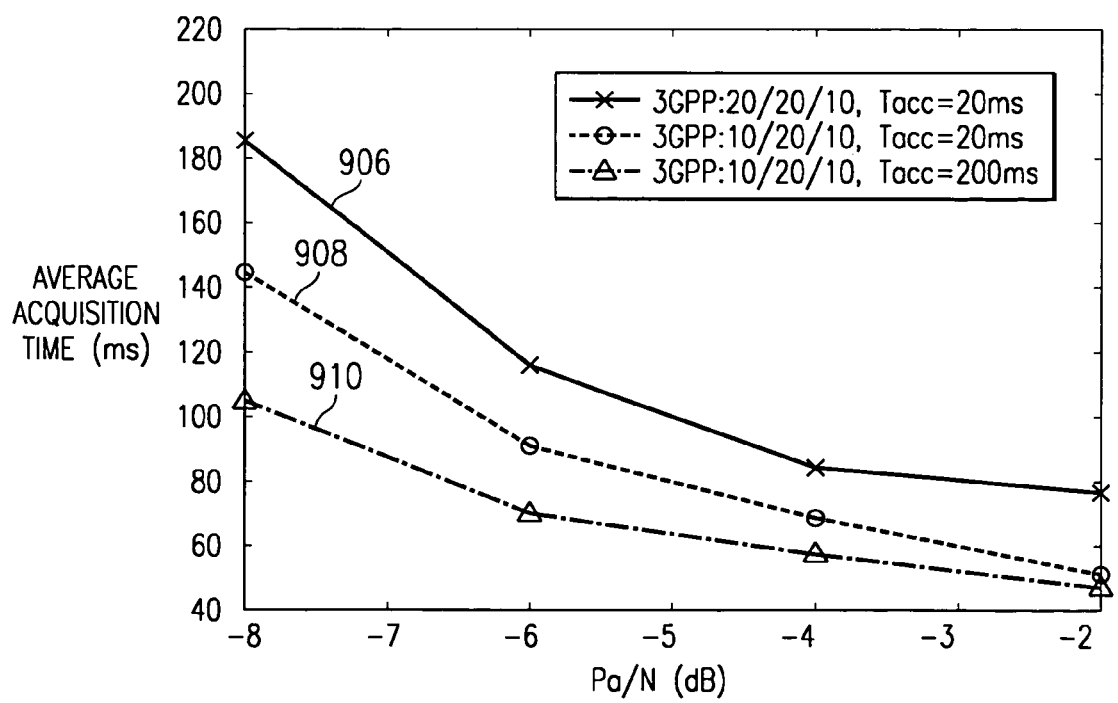
FIG. 10 is a simulation showing handoff cell acquisition time as a function of the probability of acquisition.

The simulation of FIG. 10 shows a corresponding reduction in cell acquisition time during soft handoff from one base station to another for curves 906, 908 and 910. First-stage PSC code value accumulation for curves 906 and 908 are both 20 millisecond. Curve 908, however, shows a significant reduction in acquisition time compared to curve 906 due to the 10 millisecond time in stage 1. A different stage 2 begins every 20 milliseconds for curve 906 and every 10 milliseconds for curve 908. The greater number of comparisons corresponding to curve 908, therefore, produces a comparable reduction in cell acquisition time compared to curve 906.

Although the invention has been described in detail with reference to its preferred embodiment, it is to be understood that this description is by way of example only and is not to be construed in a limiting sense. For example, advantages of the present invention may be achieved by a digital signal processing circuit as will be appreciated by those of ordinary skill in the art having access to the instant specification. Moreover, although a preferred embodiment of the present invention teaches diversity information transmission through PSC or SSC symbols, other information such as base station transmit power or system frame number may also be included. Furthermore, these PSC or SSC symbols may also be encoded as QPSK symbols rather than BPSK, thereby doubling the information content of each symbol.

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed is:

1. A method for detecting a serial signal, comprising the steps of:

receiving in an apparatus a control signal having plural logic states;

receiving the serial signal during a plurality of time periods of substantially equal duration;

comparing the serial signal to a first code to produce a match signal;

accumulating the match signal over a first number of the time periods in response to a first logic state of the control signal; and accumulating the match signal over a second number of the time periods different from the first number of time periods in response to a second logic state of the control signal.

2. A method as in claim 1, wherein the first code is a primary synchronization code.

3. A method as in claim 1, comprising the steps of:
comparing the serial signal to a second code; and
producing a second match signal as a result of the step of comparing the second code.

4. A method as in claim 3, wherein the second code is a secondary synchronization code.

5. A method as in claim 1, wherein the control signal is a power up signal.

6. A method as in claim 1, wherein the each time period of the plurality of time periods is a time slot.

7. A method as in claim 6, wherein the step of comparing the serial signal to a first code produces a match signal corresponding to each time slot.

8. A method for detecting a serial signal in an apparatus, comprising the steps of:
receiving a control signal having plural logic states;
receiving the serial signal during a plurality of time periods of substantially equal duration;
comparing the serial signal to a first code to produce a match signal;
comparing the serial signal to a second code;
producing a second match signal as a result of the step of comparing the second code, accumulating the match signal over a first number of the time periods in response to a first logic state of the control signal;
accumulating the match signal over a second number of the time periods different from the first number of time periods in response to a second logic state of the control signal;
decoding the second match signal;
producing a code group identification signal from the step of decoding; and
identifying a position of at least one time period of the plurality of time periods within a frame from the step of decoding, wherein the time period is a time slot.

9. A method for detecting a serial signal, comprising the steps of:
receiving the serial signal having a plurality of time frames, each time frame having a plurality of time slots;
comparing the serial signal to a first code to produce a match signal; and
accumulating the match signal over a plurality of time frames in response to a first logic state of a power-up signal; and
accumulating the match signal over a second number of the time periods different from the first number of time periods in response to a second logic state of the control signal.

10. A method as in claim 9, wherein the first code is a primary synchronization code.

11. A method as in claim 9, comprising the steps of:
comparing the serial signal to a second code; and
producing a second match signal as a result of the step of comparing the second code.

12. A method as in claim 11, wherein the second code is a secondary synchronization code.

13. A method as in claim 11, comprising the steps of:
decoding the second match signal; and
producing a code group identification signal from the step of decoding.

14. A method as in claim 13, comprising the steps of identifying a long code sequence in response to the code group identification signal.

15. A method as in claim 11, wherein the steps of comparing the serial signal to a first code and comparing the serial signal to a second code are executed in parallel.

16. A method for detecting a serial signal in an apparatus, comprising the steps of:
receiving the serial signal having a plurality of time frames, each time frame having a plurality of time slots;
comparing the serial signal to a first code to produce a match signal;
comparing the serial signal to a second code;
producing a second match signal as a result of the step of comparing the second code;
accumulating the match signal over a plurality of time frames in response to a logic state of a power-up signal;
decoding the second match signal; and
identifying a position of at least one time period of the plurality of time periods within a frame from the step of decoding, wherein the time period is a time slot.

17. A method of detecting a serial signal, comprising the steps of:
receiving the serial signal having a plurality of time frames, each time frame having a plurality of time slots;
comparing the serial signal to a first code for a plurality of frames;
producing a first match signal as a result of the step of comparing;
accumulating the first match signal from a first time to a third time; and
accumulating the first match signal from a second time to a fourth time.

18. A method as in claim 17, wherein the second time is after the first time and before the third time, and wherein the fourth time is after the third time.

19. A method as in claim 17, comprising the steps of:
comparing the serial signal for the number of time slots to a second code; and
producing a second match signal as a result of the step of comparing the second code.

20. A method of detecting a serial signal in an apparatus, comprising the steps of:
receiving the serial signal having a plurality of time frames, each time frame having a plurality of time slots;
comparing the serial signal to a first code for a plurality of frames;
producing a first match signal as a result of the step of comparing;
accumulating the first match signal from a first time to a third time; and
accumulating the first match signal from a second time to a fourth time, wherein the second time is after the first time and before the third time, and wherein the fourth time is after the third time;
decoding the second match signal;
producing a code group identification signal from the step of decoding; and
identifying a position within a frame from the step of decoding.

* * * * *